UNITED STATES PATENT OFFICE.

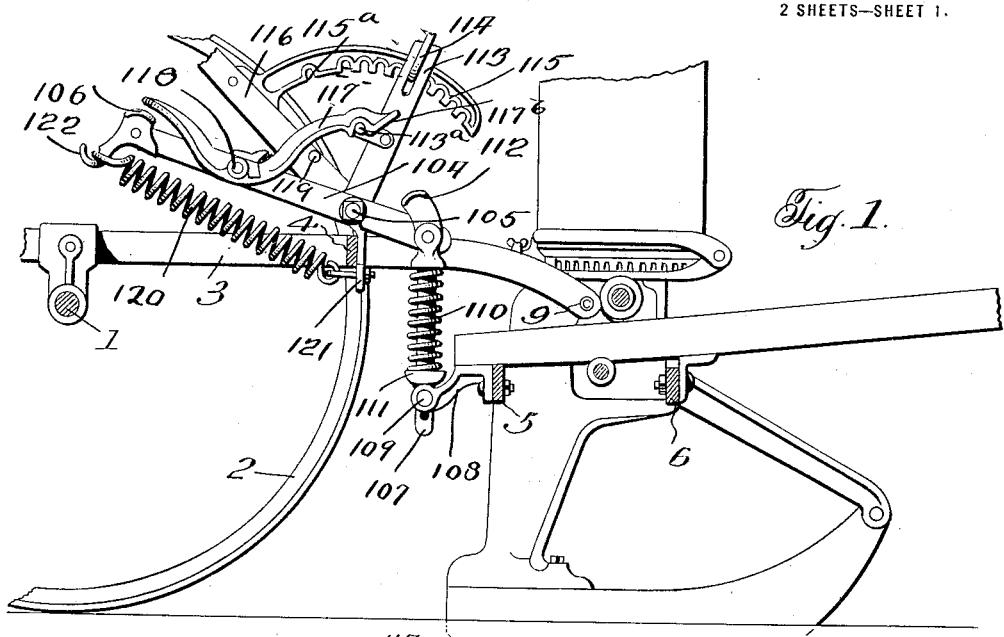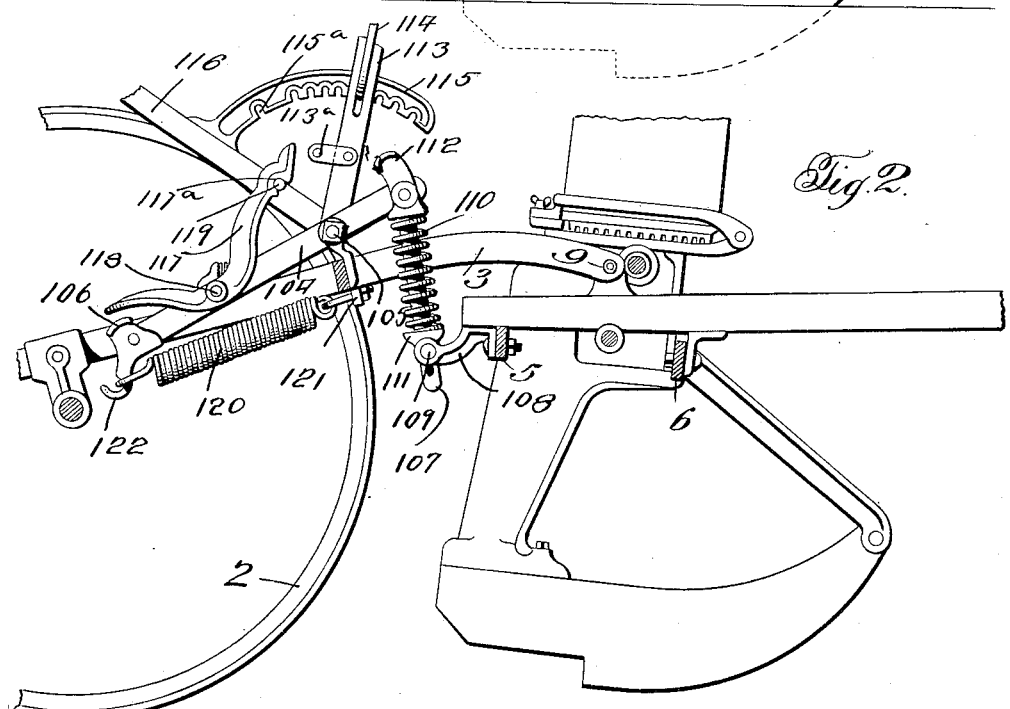

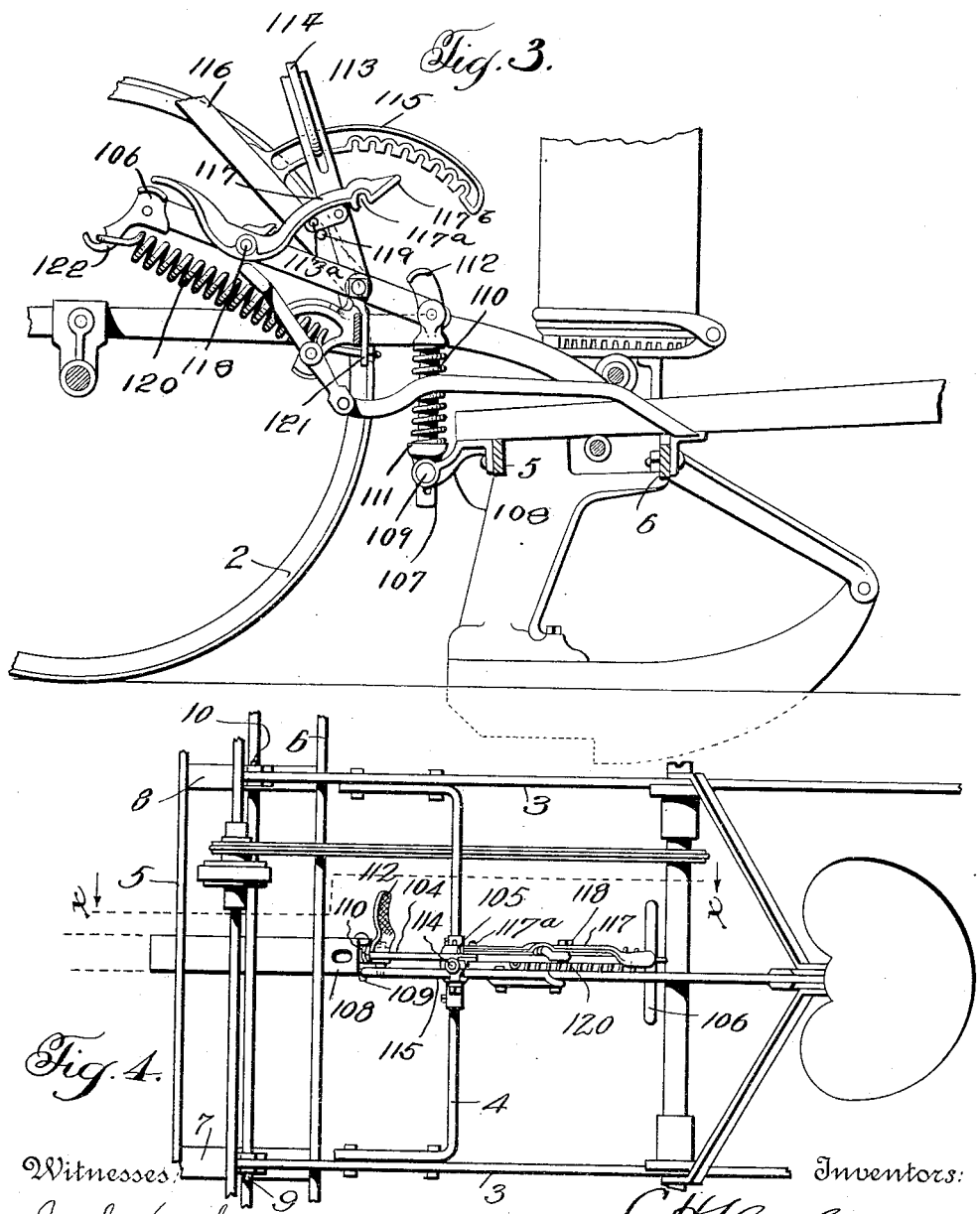

CLARENCE H. DOOLEY, OF ROCK ISLAND, ILLINOIS.

PLANTER.

1,215,626.  Specification of Letters Patent.  Patented Feb. 13, 1917.

Application filed March 24, 1910, Serial No. 551,234. Renewed August 25, 1916. Serial No. 116,937.

*To all whom it may concern:*

Be it known that I, CLARENCE H. DOOLEY, a citizen of the United States, residing at Rock Island, in the county of Rock Island and State of Illinois, have invented certain new and useful Improvements in Planters, of which the following is a specification, reference being had therein to the accompanying drawing.

This invention relates to improvements in seed planters of the class in which each is formed with two frames, a rear or wheel frame, and a front or seeder frame, the two hinged together and having combined with them a lifting and adjusting lever system.

The improvements are intended to provide a mechanism which can be controlled much more easily than can those of earlier manufacture with which I am acquainted; which will permit the driver to attain more adjustments and settings of the parts with his feet than can be attained with the earlier machines; which will enable him to fix one part of the lever system so that it can be depended upon as a depth gage, while the other part can be freely utilized for lifting the frames to an inoperative position.

The novel features of construction and their modes of operation will be readily understood from the drawings, and the description below.

Figure 1 is a vertical longitudinal section taken on the line *x—x* in Fig. 4 with the front frame in normal planting position.

Fig. 2 is a similar view with the front frame lifted to an inoperative position.

Fig. 3 is a view similar to Fig. 1 but showing the parts in the positions occupied when the frames are arranged to "float," that is when they are arranged to move up or down, more or less freely, under the control of the spring tension.

Fig. 4 is a fragmentary plan view of a portion of a planter showing the parts necessary to illustrate my invention.

Referring to the illustration of the construction selected, 1 indicates the main axle upon which the ground wheels, 2, 2, are supported and to which they are attached. The main or wheel frame, comprises, side bars, 3, 3, which are connected by brackets to the axle, a rear transverse bar and a front transverse bar 4. The front frame of the planter consists of transverse bars 5 and 6, which are connected by cross bars, or extensions, 7 and 8, and they are also connected by the base frames of the seeding mechanisms and by the check head frames. The front frame, is pivotally connected to the main frame, by means of pivots 9 and 10, which are interposed between the cross bars, 7 and 8 of the front frame and the front ends of the side bars 3, 3, of the main frame.

104 is a foot lever, which is pivoted at 105 on the main frame, said lever having a pair of foot rests 106 at its rear end. At its front end the lever 104 is connected by means of a link 107 to a bracket 108 rigid with the front frame of the machine. The connection of the link 107 with the bracket 108 is formed by a pin 109 which passes through a slot in the link 107. 110 is a compression spring interposed between a flange on the upper end of the link 107 and a flange 111 which is mounted on the pivot pin 109 and through which the link 107 extends. A foot rest 112 is mounted on the upper end of the link 107. 113 is a hand lever mounted on the pivot pin 105 and adapted to be secured in various positions by means of a locking bolt 114, which coöperates with a toothed segment 115. The latter is rigidly mounted on a part of the rear or main frame of the machine, preferably upon the bar 116, which extends upward and rearward to form a support for the driver's seat.

The foot lever 104 and hand lever 113, are detachably connected by a lever 117, which is pivoted at 118 on the foot lever 104. The lever 117 is formed with a notch 117ª at its forward end adapted to engage a pin 113ª carried by the hand lever. The extreme front end of the lever 117 is formed with a cam face or bevel 117ᵇ. The rear end of lever 117 extends to a point adjacent the foot rest 106 where it can conveniently be pressed by the operator's foot to disengage the foot lever from the hand lever.

In Fig. 1, the parts of the planter are shown in operative position, the shoe or furrow opener being in the soil. Fig. 2, shows the machine with the front frame raised to an inoperative position. This can be done in two ways: first, by simply grasping the hand lever and drawing it backward from the position shown in Fig. 1, and locking it in its extreme backward position; and second, without touching the hand lever, the operator by pressing upon the rear end of the connecting lever 117 can disengage the foot lever from the hand lever, and then by continuing to press with both feet upon the foot rest 106, the front end of the foot lever, and with it the front frame of the machine are lifted to the inoperative position shown in Fig. 2. When the parts reach this position the notch of the lever 117 passes over a pin 119 on the stationary frame bar 116, thus locking the parts in elevated position, if the driver so desires. The lifting of the front frame of the machine is made easy by the spring 120 which is connected at one end to the bracket 121 on the main frame of the machine, and at its other end to a hook 122 on the rear end of the foot lever 104, the action of the spring being to partially counterbalance the weight of the front frame mechanism. The parts having been raised to the position shown in Fig. 2, if it is desired to move them into other positions by means of the hand lever, it is only necessary to swing the latter backward, when the pin 113$^a$ will engage the cam surface 117$^b$ of the lever 117, thus lifting the latter from the pin 119 and permitting the pin 113$^a$ to move into the notch 117$^a$, thus connecting the hand lever to the foot lever 104.

With my improved combined hand and foot lever connection for the main and front frames of the machine, it is possible for the operator to adjust the machine to plant at the desired depth by means of the hand lever, and then without disturbing the hand lever move the front frame temporarily by means of the foot lever. For example, the machine may be lifted to inoperative position at the ends of the rows by means of the foot lever, and then after turning, it will be lowered to plant at the desired depth determined by the adjustment of the hand lever. Again it may be desirable in passing over exceptionally soft and mellow soil, to remove somewhat the pressure upon the front frame and this the operator can readily do by pressing upon the rear end of the foot lever 104, and simultaneously pressing upon the foot lever 117 to disengage the foot lever 104 from the hand lever. Similarly if the machine comes to an exceptionally hard spot in the soil, the foot lever may be released from the hand lever and pressure applied temporarily upon the foot rest 112, thus maintaining the furrow opener at the proper depth while passing through such hard soil.

Many operators prefer that during the greater part of their planter work, the two frames shall be so adjusted and secured, as that they shall "float." That is, so that the connection between the frames shall not be rigid, (as they will be when the catch link, or lever, 117, is latched to the hand lever), but flexible, permitting the two frames to oscillate, vertically, moving downward under the action of gravity, and upward under the strain of the spring. And even with a driver, who, on the other hand, prefers to have a rigid connection during the greater part of the time of his use of the planter, there are many occasions when superior work is performed if the parts are set for "floating."

With the present machine, this is readily and quickly accomplished by drawing the hand lever to the position where it can be held in the notch 115$^a$, for then the latch link, or lever, 117, rests idly upon the pin 113$^a$, the long curved bottom surface of the link or lever contacting with the pin. As the frames settle downward at such time, or rise upward under the action of the spring 120, the link or lever 117 slides freely forward and backward on the pin without positive engagement. While thus "floating," the frames are completely under the control of the operator's feet and weight. As soon as he desires to rigidly connect them, he has merely to grasp the hand lever, (which being normally entirely loose on its pin, can be moved in either direction instantly), and push it forward, a few inches till the pin 113$^a$ automatically seats itself in notch 117$^a$; or exerts weight on the rear end of the foot lever 104 enough to draw it back a few inches when the latch link, or lever 117, will automatically catch the pin.

It will be seen that when the parts are set for "floating" as described, the hand lever is locked in a fixed position in relation to the driver, and is not permitted to vibrate toward him and from him as the frames move down and up.

This system of parts provides for the driver having a combined hand lever and foot lever, so that he can bring to bear both hand power and foot power when desired, the levers being rigidly connected at such time. Again, it provides for a permanent gaging of a desired depth of plowing irrespective of the positions of the frames, which, when the gage is fixed, can be completely controlled by the foot.

What I claim is—

1. In a planter, the combination with a main wheel frame, a front transverse frame and soil opening runners, the said front frame being adapted to carry seed separating mechanism and seed depositing mechanism, of a means for moving the front frame relatively to the main frame comprising a foot lever pivoted on the main frame and connected with the front frame and having two foot rests, one for elevating the front frame and one for depressing the front frame, a hand lever pivoted to the main frame and adapted to be locked in any one of a number of positions, and a latch for detachably connecting the foot and hand levers, the said latch being mounted on the foot lever in position to be engaged by the operator's foot on the rest for elevating the front frame, whereby the operator may by a single motion and without shifting the position of his feet on the lever disconnect the foot lever from the hand lever and elevate the front frame.

2. In a planter, the combination with a main wheel frame, a transverse front frame hinged to the wheel frame, and soil opening runners, the said front frame being adapted to carry seed separating and dropping mechanism, of means for moving the front frame relative to the wheel frame comprising a foot lever pivoted on the wheel frame and connected to the front frame, a locking hand lever pivoted on the wheel frame, and a foot latch mounted on the foot lever and adapted to detachably connect the foot lever either to the hand lever or to the wheel frame, whereby the front frame can be adjusted by moving the hand lever or can be adjusted and held in adjusted position by the foot lever independently of the hand lever.

3. In a planter, the combination with the wheel frame and the runner frame adjustably connected thereto, of two lifting levers pivoted on the wheel frame, a connection between one lever and the runner frame, means for locking the other lever to the main frame in adjusted position, means for locking the two levers together in a manner to prevent relative movement in either direction, and means for locking the first said lever to the main frame, the last two said locking means being so related that one is inoperative when the other is operative and vice versa.

4. In a planter, the combination of a main wheel frame, a runner frame pivotally connected thereto, a foot lever pivoted to the main frame and connected with the runner frame, the said foot lever being provided with a foot rest for elevating the runner frame and a foot rest for depressing the runner frame, a hand lever pivoted on the main frame, means for locking the hand lever to the main frame, and a means controllable by the operator's foot on the elevating foot rest for detachably connecting the foot lever to the hand lever or to the main frame.

5. In a planter, the combination with a main wheel frame, and a runner frame pivotally connected to the wheel frame, of a hand lever, means for locking the hand lever to the wheel frame in one of a plurality of positions, a foot lever connected with the runner frame, and a single foot latch for locking the foot lever either to the hand lever or to the wheel frame, substantially as set forth.

6. In a planter, the combination of a main wheel frame, a runner frame pivotally connected with the wheel frame, a hand lever and a foot lever, each independently pivoted to the wheel frame, means for locking the hand lever in position relative to the main frame, connections between the foot lever and the runner frame, and a foot latch mounted on the foot lever within reach of the driver's foot when it is in position for operating the foot lever, the said latch being adapted to connect the foot lever either to the hand lever or the wheel frame, substantially as set forth.

7. In a planter, the combination of a main wheel frame, a runner frame pivotally connected with the wheel frame, a hand lever and a foot lever, each independently pivoted to the wheel frame, means for locking the hand lever in position relative to the wheel frame, connections between the foot lever and the runner frame, and a foot latch on the foot lever adapted to engage either the hand lever or the wheel frame, the said latch being provided with a beveled surface adapted to be engaged by the hand lever to move the latch out of engagement with the frame and into engagement with the hand lever, substantially as set forth.

In testimony whereof I affix my signature, in presence of two witnesses.

CLARENCE H. DOOLEY.

Witnesses:
GALE PORTER,
RALPH B. LOURIE.

Copies of this patent may be obtained for five cents each, by addressing the "Commissioner of Patents, Washington, D. C."